United States Patent
Sonnendorfer et al.

(10) Patent No.: US 9,522,691 B2
(45) Date of Patent: Dec. 20, 2016

(54) PUSH HANDLE FOR A SHOPPING TROLLEY

(76) Inventors: Horst Sonnendorfer, Puchheim (DE); Elvira Sonnendorfer, legal representative, Puchheim (DE); Andreas Filosi, legal representative, Puchheim (DE); Franz Wieth, Puchheim (DE)

(*) Notice: Subject to any disclaimer, the term of this patent is extended or adjusted under 35 U.S.C. 154(b) by 119 days.

(21) Appl. No.: 14/351,719

(22) PCT Filed: Sep. 14, 2012

(86) PCT No.: PCT/EP2012/068138
§ 371 (c)(1),
(2), (4) Date: Aug. 29, 2014

(87) PCT Pub. No.: WO2013/053567
PCT Pub. Date: Apr. 18, 2013

(65) Prior Publication Data
US 2014/0375456 A1    Dec. 25, 2014

(30) Foreign Application Priority Data

Oct. 14, 2011  (DE) .................... 10 2011 115 900
Nov. 15, 2011  (DE) .................... 10 2011 118 506

(51) Int. Cl.
| | |
|---|---|
| *B62B 5/00* | (2006.01) |
| *B62B 3/14* | (2006.01) |
| *B62B 5/06* | (2006.01) |
| *H04M 1/04* | (2006.01) |
| *G08B 13/22* | (2006.01) |

(52) U.S. Cl.
CPC ........... *B62B 3/1472* (2013.01); *B62B 3/1424* (2013.01); *B62B 3/1428* (2013.01); *B62B 5/00* (2013.01); *B62B 5/06* (2013.01); *G08B 13/22* (2013.01); *H04M 1/04* (2013.01)

(58) Field of Classification Search
CPC .... B62B 3/1424; B62B 3/1472; B62B 3/1416; B62B 3/1432; B62B 5/06; B62B 3/14; B62B 5/00; B62B 1/04
USPC ..... 340/568.5, 539.11, 573.1, 5.61; 224/411, 224/570; 280/33.992, 33.994; 248/214, 248/553
See application file for complete search history.

(56) References Cited

U.S. PATENT DOCUMENTS

| | | | |
|---|---|---|---|
| 4,683,609 A * | 8/1987 | Trubiano | B62B 3/1408 16/422 |
| 5,259,633 A * | 11/1993 | Sonnendorfer | G07F 7/0663 194/905 |
| 5,263,578 A | 11/1993 | Narvey | |
| 6,453,588 B1 * | 9/2002 | Lykens | G09F 7/04 280/33.992 |
| 6,481,684 B1 | 11/2002 | Farmer et al. | |

(Continued)

FOREIGN PATENT DOCUMENTS

| | | |
|---|---|---|
| DE | 29510138 U1 | 9/1995 |
| DE | 29612195 U1 | 8/1996 |

(Continued)

*Primary Examiner* — Hung T Nguyen
(74) *Attorney, Agent, or Firm* — Laurence A. Greenberg; Werner H. Stemer; Ralph E. Locher

(57) ABSTRACT

A push handle for a shopping trolley contains a holder for a mobile telecommunications terminal, in particular a smartphone. The holder includes a mounting for the telecommunications terminal and a pivot joint by which the mounting can be pivoted between a home position when it rests against the push handle and a holding position when it extends away from the push handle.

16 Claims, 3 Drawing Sheets

(56) References Cited

U.S. PATENT DOCUMENTS

| | | | |
|---|---|---|---|
| 6,817,066 B1 | 11/2004 | Williams et al. | |
| 7,042,718 B2 | 5/2006 | Aoki et al. | |
| 8,699,201 B2 | 4/2014 | Kohri et al. | |
| 8,720,911 B2* | 5/2014 | Sonnendorfer | B62B 3/1404 194/905 |
| 8,746,709 B2 | 6/2014 | Wieth et al. | |
| 2003/0011477 A1* | 1/2003 | Clapper | G01S 5/02 340/573.1 |
| 2008/0059880 A1* | 3/2008 | Cato | B62B 3/1408 715/700 |
| 2010/0222031 A1* | 9/2010 | Carolan | G08C 17/02 455/414.1 |
| 2010/0264182 A1 | 10/2010 | Perlman et al. | |
| 2010/0299193 A1* | 11/2010 | Cosman | G06Q 30/02 705/14.13 |
| 2011/0278806 A1* | 11/2011 | Wieth | B62B 3/1428 280/33.992 |

FOREIGN PATENT DOCUMENTS

| | | | |
|---|---|---|---|
| DE | 19858450 A1 | 6/2000 | |
| DE | 20221078 U1 | 12/2004 | |
| DE | 202009009732 U1 | 12/2010 | |
| DE | 202009014266 U1 | 3/2011 | |
| EP | 1014600 A2 | 6/2000 | |
| GB | 2393526 A | 3/2004 | |
| GB | 2 454 274 * | 10/2007 | ............ G06Q 10/00 |
| JP | H05122316 A | 5/1993 | |
| JP | 3136480 B2 | 2/2001 | |
| JP | 2003228445 A | 8/2003 | |
| JP | 2004359034 A | 12/2004 | |
| JP | 2010086215 A | 4/2010 | |
| JP | 2011215131 A | 10/2011 | |
| WO | WO 01/93150 * | 5/2000 | ............ G06F 17/60 |
| WO | 2010099772 A1 | 9/2010 | |

* cited by examiner

PUSH HANDLE FOR A SHOPPING TROLLEY

BACKGROUND OF THE INVENTION

Field of the Invention

The invention relates to a push handle for a shopping trolley and an anti-theft alarm system consisting of a push handle according to the invention and a mobile telecommunications terminal.

Push handles for shopping trolleys have long since outgrown the task they were originally designed for. The simple bar with which a trolley was pushed through the shop has become a function carrier, which has to meet a variety of requirements. The modern push handle is usually ergonomically shaped, normally carries a deposit lock and often includes an advertising display.

Sometimes push handles for shopping trolleys also include a holder suitable for carrying further functional parts on the push handle. As such the GB 2 393 526 A shows a magnifying glass which is held on a push handle by means of a swan neck. Such a swan neck is extremely flexible enabling the magnifying glass to be held in any desired position. This holder, however, requires a lot of space and therefore is often in the way when the customer wants to deposit goods in the trolley. In addition these holders are not flexible. They are firmly connected with the magnifying glass thereby preventing other functional parts from being attached to the push handle.

For some time now push handles can also be equipped with a holder for a proprietary shopping assistant which the respective shop offers to customers for their use. Such shopping assistants, i.e. their displays, are used, for example, to request in-depth information on goods offered for sale or to draw the customer's attention to special offers. The information to be communicated is usually made available via a WLAN present in the shop.

Such a shopping assistant is issued in the shop and requires a proprietary holder, into which it can be placed during shopping. For this purpose a holder suitable to hold the shopping assistant is provided on the push handle. Once shopping is completed the shopping assistant remains in the shop which means that its use to the customer is limited to the few things the customer can buy in the shop.

In contrast to a proprietary shopping assistant modern mobile telecommunication terminals also called smartphones in the following are designed in such a way that the owner can adapt them to his/her needs and preferences. At the same time the smartphone's owner usually takes the phone with him wherever he or she goes. As a result they are increasingly used for tasks which previously had to be performed by other means. The mobile telecommunication terminals called smartphones in this application are understood to include suitably equipped portable tablet PCs such as the ipad by Apple.

Smartphones are also increasingly gaining in importance in the general context of shopping. This becomes evident just when thinking of the shopping list. This can be created on the device and retrieved in the shop, thereby eliminating the danger of forgetting some of the items which are required because the hand-written shopping list had been left at home.

However handling the smartphone while shopping is somewhat cumbersome because of frequent interruptions. The customer does usually not have a free hand available and is obliged to repeatedly deposit the phone somewhere. He needs his hands in other ways, for example in order to pick up shopping items or to push the trolley. The customer's hands are tied in every sense of the word.

BRIEF SUMMARY OF THE INVENTION

It is the requirement of the invention to propose a push handle for a shopping trolley on which a mobile telecommunications terminal, which the customer has brought along, can be held in a simple manner and carried along during shopping in such a way that it is easily operable.

This requirement is met by a push handle for a shopping trolley according to the independent claim. Particularly advantageous embodiments of the push handle are described in the sub-claims.

An essential basic thought of the present invention consists in equipping the push handle with a holder for a smartphone which the customer carries with him. The proposed holder includes a mounting for the telecommunications terminal and a pivot joint by means of which the mounting is pivot able between a home position in which it rests against the push handle and a holding position in which it is pivot able and extends away from the push handle.

The basic equipment of smartphones is identical to that of proprietary shopping assistants the use of which is limited. They comprise a camera which is useful for taking a photo of the barcode, for example, and the necessary interfaces for a wireless data exchange such as WLAN or Bluetooth. They are thus in a position to replace the proprietary shopping assistants. In addition they offer further distinctly useful possibilities.

By now, there are smartphones being offered by big commercial chains which comprise shopping-supporting functions. These go far beyond the capabilities of the shopping assistants, because it is possible to prepare the shopping trip at home by smartphone. For example a shopping list can be prepared by simply scanning the barcode of used-up items. The ingredients required for recipes can be automatically collated and added to the shopping list. In addition it is possible to query prices of certain products when still at home.

The proposed holder enables the customer to keep his smartphone with him during shopping and to operate it during shopping without having to constantly hold it by hand. In this way the smartphone's functions are easily accessible. If on the other hand the holder is not needed, it can be left in the home position, in which takes up little space, is not in the user's way during shopping and does not obstruct the pushing-together of shopping trolleys.

Operation of the holder is almost self-explanatory. In its home position the holder including the mounting for the smartphone rests against the push handle. In order to be able to insert his smartphone into the mounting the customer has no choice but to open the holder whereby the mounting is pivoted into the holding position.

It is an advantage if the holding position of the mounting is configured inclined by approx. 30 degree to the vertical. The display of the telecommunications terminal held in the mounting is then inclined obliquely upwards and is easily readable by the customer pushing the shopping trolley.

In a preferred embodiment the mounting comprises a lock for the telecommunications terminal, in particular a locking bracket with which at least a portion of the telecommunications terminal can be embraced. The lock not only ensures that the smartphone is held securely in the mounting, but that it is also protected against unauthorised removal. In order to make it possible for the smartphone to be stolen at an unobserved moment when the customer's eyes are turned away, the thief must first undo the lock.

Preferably the lock is adjustable by operating two buttons arranged opposite each other on the mounting. The spaced-apart buttons can be easily operated and at the same time prevent an unintentional adjustment of the lock by inadvertently touching it. In addition they force the customer, when opening or closing the lock, to hold his opened hand in front of the mounting, thereby preventing the smartphone from inadvertently falling out of the mounting.

An additional security measure consists in that the mechanism to be operated for undoing the lock can be blocked. When blocked the customer is able to move freely in the shop and to take his eyes off the smartphone held in the holder without feeling guilty.

In a preferred embodiment blocking the mechanism is dependent upon the position of the mounting. The block is released only after the mounting has been pivoted into a predetermined, in particular vertically aligned, removal position. In the holding position of the mounting the mechanism with this embodiment is blocked, and when this position is assumed locking is effected automatically. It is therefore not necessary for the customer to specifically block the lock.

This embodiment is suitable in particular for an anti-theft alarm system which triggers an alarm if the smartphone is removed. The anti-theft alarm system combines the functionality of the push handle with certain properties of a telecommunications terminal held in the mounting of the push handle. Many smartphones are by now equipped with an inclination sensor which can detect a change in the position of the smartphone. In this respect particular reference is made to the spirit-level-APP popular with the Apple iPhone.

With the proposed anti-theft alarm system a program product running on the telecommunications terminal, in particular an application, interacts with the inclination sensor in such a way that pivoting of the telecommunications terminal from the holding position into the removal position triggers a code query and that if no code or a false code is entered, a signal is issued at the telecommunications terminal.

The anti-theft alarm system can, of course, also be used in the other embodiments of the push handle according to the invention.

An alternative to automatic blocking consists in manual blocking of the mechanism. A number lock may be provided for this purpose, for example. The number lock is set following locking and can only be reopened using the number sequence known to the customer.

In a preferred embodiment the number lock comprises an automatic zero position, triggered by pivoting the holder into the home position on the push handle, for example. The next customer therefore does not need to reset the number lock before he can use it. Alternatively the customer using the number lock may be forced to manually reset it into its zero position. To this effect it is merely necessary to block pivoting of the holder into the home position if the number lock is not reset. In order to be able to remove his deposit when the holder is in home position, the customer is forced to reset the number lock.

It is particularly advantageous if the mounting comprises a detector which detects whether a telecommunications terminal is present in the mounting. Such detection opens the way for a variety of other applications as explained in the following.

For example the detector may be used to block pivoting of the mounting into the home position if the telecommunications terminal is detected. This has the advantage that the customer cannot inadvertently close the holder forgetting that after he has finished shopping his smartphone is still in the mounting.

One particular advantage consists in that the mounting may additionally comprise a shield for a deposit lock arranged on the push handle. The shield is configured such that it covers the lock orifice of the deposit lock in the home position of the mounting and exposes it in the working position of the mounting. With this embodiment the customer can insert a key into the deposit lock only if the mounting has been pivoted into the home position. In order to be able to do this he must first remove his smartphone. Otherwise the deposit lock aperture remains locked and the customer cannot therefore remove his deposit held in the deposit lock. This is an effective measure of preventing the smartphone from being forgotten in the mounting.

Preferably the mounting comprises an electrical interface for the mobile telecommunications terminal. The interface permits the transmission of energy or data and thus represents a basis for a plurality of further advantageous functions.

To this effect it may already be sufficient for the electrical interface to merely detect a contact. For example, the electrical interface may be used in conjunction with an anti-theft alarm. The interface then functions as a detector which detects whether the smartphone is present in the mounting or not. On removal of the telecommunications terminal from the mounting the electrical connection is interrupted, triggering a signal issued on the push handle and/or the terminal. In this respect it is not necessary for a charge and/or data to be communicated.

In a preferred embodiment the electrical interface connects the telecommunications terminal with an energy source arranged on the shopping trolley. The customer thus receives an auxiliary service when he inserts his smartphone into the mounting. His smartphone is charged during this time. The necessary energy source may be arranged on the push handle. For example, it is possible to equip the push handle with a suitable battery. The battery in turn may be charged in a simple manner by solar cells arranged on the push handle and/or by a dynamo integrated with the shopping trolley roller. It is thus not necessary to arrange for a charging station where the battery would otherwise have to be charged. Alternatively it is possible to omit batteries and to charge the smartphones directly via solar cells and/or the dynamo.

If the push handle comprises an advertising surface it is of advantage to use the electrical interface for transmitting advertising information and/or energy to the advertising surface. A separate interface for the advertising surface may thus be omitted. At the same time it is possible to charge the advertising surface via the above-mentioned energy sources.

Advantageously the push handle comprises an interface for the wireless transmission of information between the telecommunications terminal and an advertising surface. A data connection achieved over only a short distance can issue an alarm signal if an interruption occurs, drawing the attention to the removal of the smartphone.

A particular advantage is of course to adapt the shape of the holder and/or its interfaces or detectors to suit certain types of mobile telecommunications terminal, such as the iphones of Apple. One design of the holder covering several types and manufacturers works well with the increasing assimilation of smartphones. For example, the standardisation of ports which has taken place in the meantime ensures that any charging device can be connected. A suitably designed interface is thus able to cover a multitude of smartphone types.

A lock in a preferred embodiment of the invention will now be explained in detail in the form of a sequence of events with reference to the following figures.

DESCRIPTION OF THE INVENTION

Figure 1:
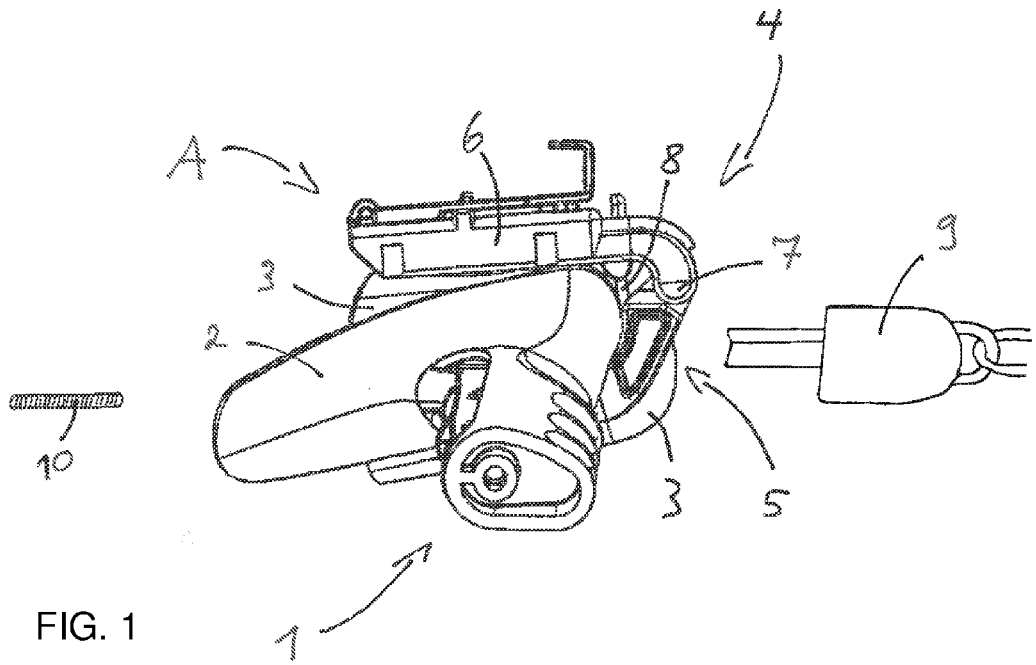
FIG. 1 shows a side view of the push handle with a holder in the home position.

FIG. 1 shows a push handle 1 comprising an advertising display 2 and a deposit lock 3 largely hidden behind the advertising display 2. On the push handle 1 a holder 4 for a smartphone is arranged level with the deposit lock 3. The holder 4 is attached, for example screwed, to the push handle 1 on both sides of a lock aperture 5. The mounting 6 of the holder 4 is pivot ably connected with the push handle 1 via a pivot joint 7 arranged above the deposit lock aperture 5.

In the home position A shown in FIG. 1 the mounting 6 rests against the push handle 1, or to be more precise against the top of the deposit lock 3. In the home position A a shield 8 held on the mounting 5 exposes the deposit lock aperture 5 so that a deposit key 9, after pushing a deposit 10 into the deposit lock 3, can be removed and also be reinserted. With the deposit key 9 inserted the mounting is blocked in the home position A, since the key head of the inserted deposit key 9 prevents pivoting of the mounting 6.

Figure 2:
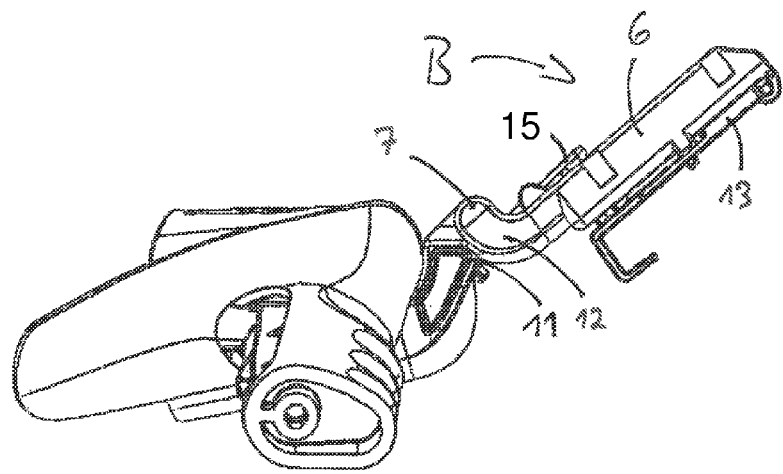
FIG. 2 shows a side view of the push handle with a holder pivoted into the holding position.

In the holding position B of the mounting 6 shown in FIG. 2 the mounting 6 is inclined away from the push handle 1 at an angle of approx. 30 degrees to the vertical. The pivot angle of the pivot joint 7 is limited by a support 11, which the holder 4 forms below the pivot joint for the curved carriers 12 of the mounting 6. In the holding position B the mounting 6 is securely held by its own weight and the additional weight of an inserted smartphone.

Pivoting the mounting into the holding position B leads to a change in the position of the shield 8, which now covers the lock aperture 5 and prevents the deposit key 9 from being inserted. It is thus ensured that the mounting must be pivoted into the home position A in order to remove the deposit 10 again.

The mounting 6 is formed as a shell and comprises a locking bracket 13 on its back, which is pivotably held in the mounting via a pivot joint 14 arranged at the upper end of the mounting 6. At the front a mechanical detector 15 is provided which is glidingly moved when the smartphone is inserted. With the smartphone inserted the detector is in a position in which it blocks any pivoting of the mounting into the home position A.

Figure 3:
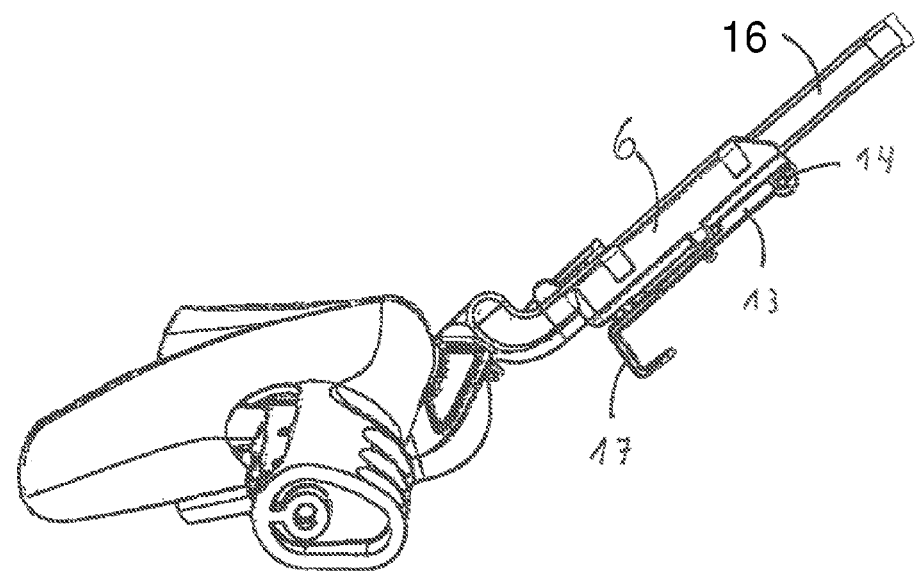
FIG. 3 shows a side view according to FIG. 2 with a smartphone inserted into the mounting.
Figure 4:
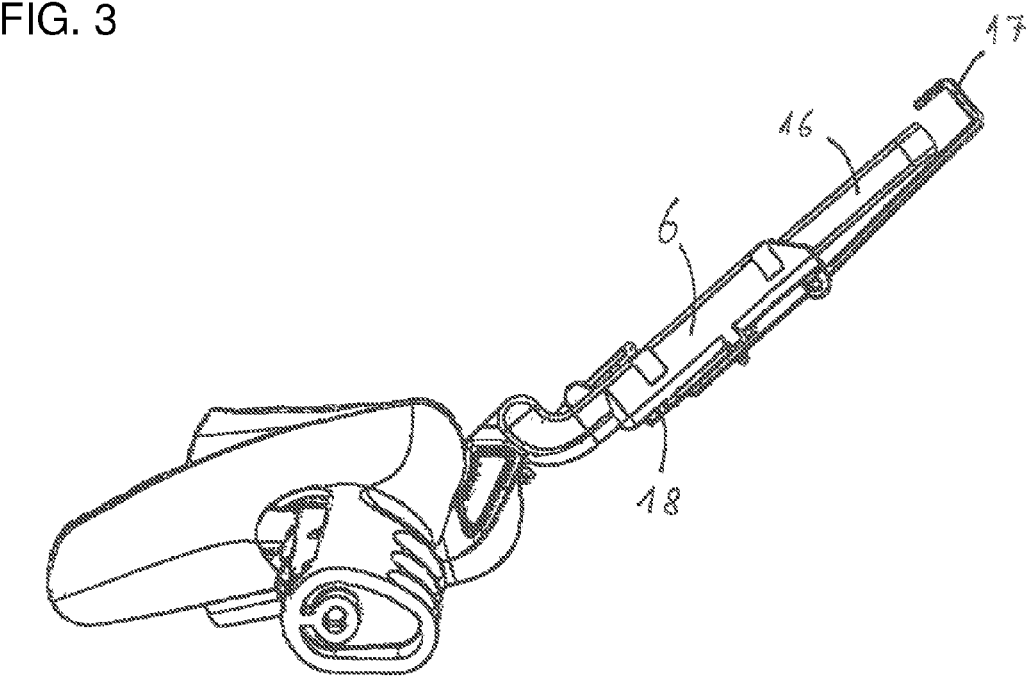
FIG. 4 shows a side view according to FIG. 3 with a locking bracket swung over the smartphone.

FIGS. 3 and 4 show how the smartphone 16 is inserted into the mounting 6 and how the mounting is then locked using the locking bracket 13. In the position shown in FIGS. 2 and 3 the locking bracket 13 is arranged behind the mounting, preferably resting against a stop. In this position it is covered by the mounting 6 and is not in the way when the smartphone 16 is inserted or removed.

At its end opposite the pivot joint 14 the locking bracket 13 comprises a claw 17. After the smartphone 16 has been placed into the mounting 6 the locking bracket 13 is swung by the customer out of its rear-side position, until its claw 17 is positioned above the smartphone 16 protruding from the mounting 6.

Figure 5:
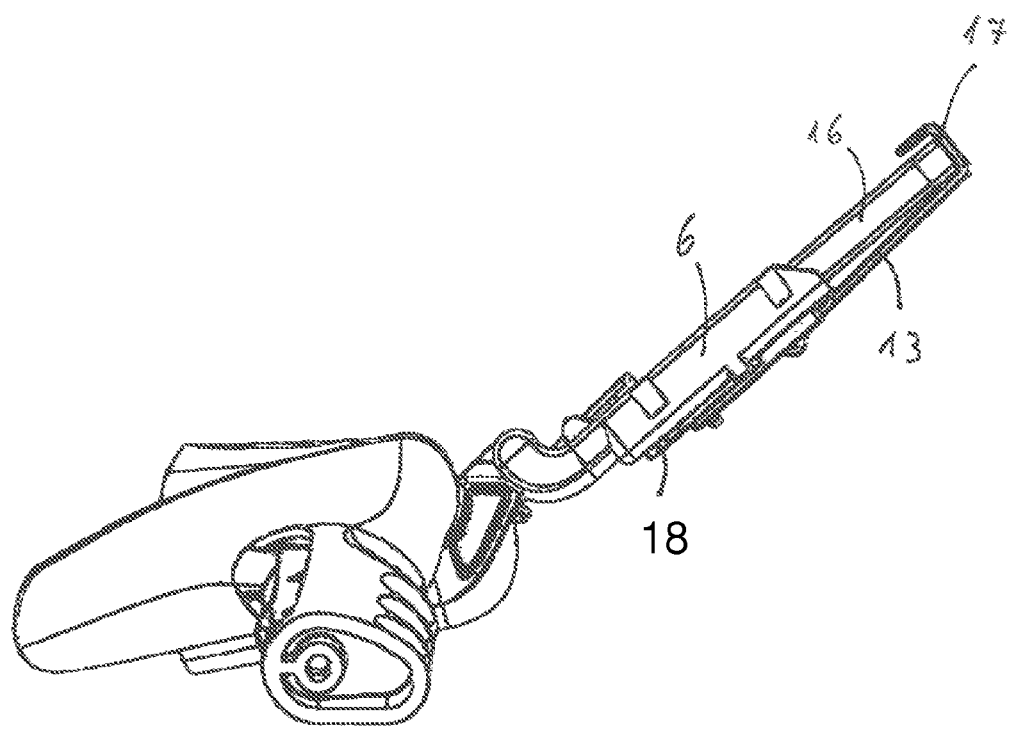
FIG. 5 shows a side view according to FIG. 4 with the smartphone locked.

In order to fix the smartphone as shown in FIG. 5 by lowering the locking bracket 13, it is necessary to simultaneously operate two buttons 18 arranged on either side of the mounting.

Removing the smartphone 16 and resetting the mounting 6 is effected in reverse order.

The invention claimed is:

1. A push handle for a shopping trolley, the push handle comprising:
    a holder for a mobile telecommunications terminal, said holder having a mounting for the mobile telecommunications terminal and a pivot joint by which said mounting can be pivoted between a home position when said holder is resting against the push handle and a holding position extending away from the push handle;
    said mounting having a lock for securing the mobile telecommunications terminal in said mounting, said lock having a locking bracket which is movable toward and away from said mobile telecommunications terminal for embracing and securing said mobile telecommunications terminal in said mounting; and
    a mechanism to be operated for undoing said lock, and an operation of said mechanism can be blocked, wherein a blockage of said mechanism being dependent upon a position of said mounting and that the blockage is released after said mounting has been pivoted into a predetermined removal position.

2. The push handle according to claim 1, wherein said mounting in the holding position is inclined by approximately 30 degrees to vertical so that a display of the mobile telecommunications terminal held in said mounting is visible to a customer pushing the shopping trolley.

3. The push handle according to claim 1, wherein said mechanism has two buttons disposed opposite each other on said mounting, said lock is adjustable by operating said two buttons.

4. The push handle according to claim 1, further comprising a number lock for blocking said mechanism.

5. The push handle according to claim 1, wherein said mounting contains a detector which detects whether the telecommunications terminal is present in said mounting.

6. The push handle according to claim 5, wherein when the telecommunications terminal is detected, pivoting said mounting into the home position is blocked.

7. The push handle according to claim 1, wherein said mounting contains an electrical interface for the telecommunications terminal.

8. The push handle according to claim 7, wherein said electrical interface connects the telecommunications terminal with an energy source disposed on the shopping trolley.

9. The push handle according to claim 7, wherein advertising information and/or energy can be transmitted via said electrical interface to an advertising surface arranged on the push handle.

10. The push handle according to claim 1, further comprising:
    an electronic advertising surface; and
    a data interface for wireless transmission of information between the telecommunications terminal and said electronic advertising surface.

11. The push handle according to claim 10, wherein an interruption of the wireless transmission and/or a removal of the telecommunications terminal from said mounting triggers a signal issued by the push handle.

12. The push handle according to claim 1,
further comprising a deposit key;
further comprising a deposit lock having a lock aperture; and
wherein said mounting has a shield for said deposit key, said shield covers said lock aperture of said deposit lock in the holding position of said mounting and exposes said lock aperture in the home position of said mounting.

13. The push handle according to claim 1, wherein the mobile telecommunications terminal is a smartphone.

14. The push handle according to claim 1, wherein the blockage of said mechanism is dependent upon a position of said mounting and that the blockage is released after said mounting has been pivoted into a predetermined, vertically aligned removal position.

15. An anti-theft alarm system, comprising:
a mobile telecommunications terminal having an inclination sensor;
a push handle containing a holder for receiving said mobile telecommunications terminal, said holder having a mounting for said mobile telecommunications terminal and a pivot joint by which said mounting can be pivoted between a home position when said holder is resting against said push handle and a holding position extending away from said push handle; and
a program product interacting with said inclination sensor such that pivoting said mobile telecommunications terminal from the holding position into a removal position triggers a code query and that a signal is issued on said mobile telecommunications terminal when no code or a false code is entered.

16. The anti-theft alarm system according to claim 15, wherein said program product is an application running in said telecommunications terminal.

* * * * *